Carr, Shannon & Carr,
Fish Net,
Nº 3,741. Patented Sep. 14, 1844.
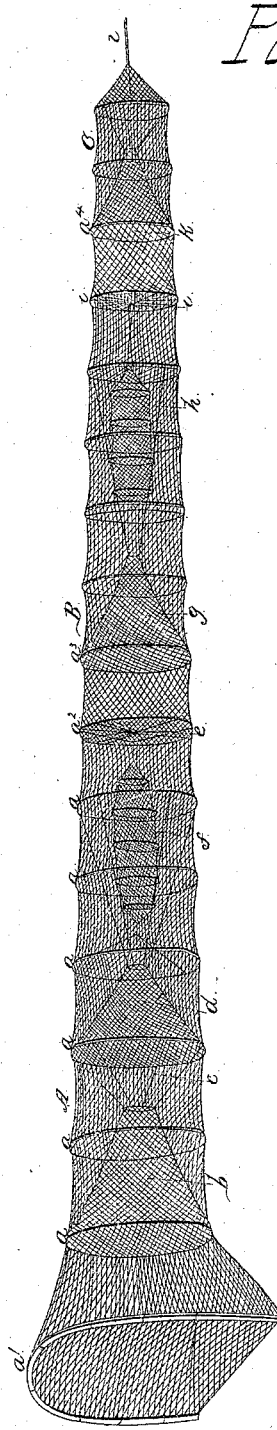

UNITED STATES PATENT OFFICE.

JOHN CARR, JACKSON SHANNON, AND WM. CARR, OF SUNBURY, PA.

IMPROVEMENT IN FISH-NETS.

Specification forming part of Letters Patent No. 3,741, dated September 14, 1844.

*To all whom it may concern:*

Be it known that we, JOHN CARR, JACKSON SHANNON, and WILLIAM CARR, of Sunbury, in the county of Northumberland and State of Pennsylvania, have invented certain Improvements in Fish-Nets, &c.; and we do hereby declare that the following is a full, clear, and exact description thereof, reference being had to the accompanying drawings, which form a part of this specification, in which—

Figure 1 shows a general view; Fig. 2, one of the bait-bags detached.

The nature of our invention consists in dividing a cylindrical net into different compartments and furnishing each with a bait-bag, the bait being suited to the different kinds of fish, and the large fish being prevented from entering the compartment of the smaller ones.

Its construction is as follows: A cylindrical net is formed in the ordinary way and of the required length. The first compartment, A, is formed of large meshes. It is distended with a series of circular hoops, $a\ a$, the first one, $a'$, being a D-shaped one for the entrance into the net, within the mouth of which, from the second hoop backward, there is a funnel-shaped gorge, $b$, which gradually contracts toward the inner end conically, where it terminates in a small aperture, which is kept distended by cords $c$. Within this there is a similar-shaped entrance, $d$, and at the termination of the first division there is a division, $e$, stretched across, of the same large-size meshes as those of the net, and attached to the hoop $a^2$. Between the second funnel, $d$, and the division $e$ there is a small cylindrical net, $f$, distended with hoops, and having very small meshes. This is closed at both ends, and is fastened in the center of the large net. It is for the purpose of containing bait, which can be kept alive therein. From the partition $e$ the net is continued on, and kept distended similar to the first compartment, forming another compartment, B, which, after reaching the first hoop, $a^3$, is made with smaller meshes. At this point it has a funnel, $g$, similar to those in the first compartment, and behind it is a second bait-bag, $h$, in all respects like the first.

The compartment B is terminated by a partition, $i$. The same sized mesh or larger is continued on to another hoop, $a^4$, from which the meshes are fine enough to hold small fish for bait, and this part C is furnished with the usual funnel-shaped mouth $k$, and its end is terminated by a cord, $l$.

A net constructed after the above plan will serve to catch salmon, &c., in the first compartment, from which eels and smaller fish will be driven out; but they have free access to the next compartment, where they are caught, while bait-fish enough to supply the two first may be obtained by the last compartment, in which something may be placed to attract them.

Having thus fully described our improvement, what we claim therein as new, and desire to secure by Letters Patent, is—

1. The combination of a series of compartments, in the manner and for the purpose described.

2. The combination therewith of the bait-bags, as herein specified.

WILLIAM CARR.
    JOHN CARR.
    JACKSON SHANNON.

Witnesses:
 JOHN B. BOYD,
 SAML. G. MAUS.